United States Patent
Saito

(10) Patent No.: US 11,237,722 B2
(45) Date of Patent: Feb. 1, 2022

(54) ELECTRONIC DEVICE, INPUT CONTROL METHOD, AND PROGRAM FOR CONTROLLING A POINTER ON A DISPLAY

(71) Applicant: Panasonic Intellectual Property Management Co., Ltd., Osaka (JP)

(72) Inventor: Shunsuke Saito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/407,123

(22) Filed: May 8, 2019

(65) Prior Publication Data

US 2019/0265883 A1 Aug. 29, 2019

Related U.S. Application Data

(63) Continuation of application No. PCT/JP2017/038115, filed on Oct. 23, 2017.

(30) Foreign Application Priority Data

Dec. 27, 2016 (JP) .............................. JP2016-253397

(51) Int. Cl.
*G06F 1/16* (2006.01)
*G06F 3/0488* (2013.01)
(Continued)

(52) U.S. Cl.
CPC ...... *G06F 3/04883* (2013.01); *G06F 3/03547* (2013.01); *G06F 3/0481* (2013.01);
(Continued)

(58) Field of Classification Search
CPC .. G06F 1/1616; G06F 1/1654; G06F 3/03547; G06F 3/0481; G06F 3/04812;
(Continued)

(56) References Cited

U.S. PATENT DOCUMENTS 9,465,457 B2 * 10/2016 Thompson .............. G06F 3/038
2003/0174149 A1 9/2003 Fujisaki et al.
(Continued)

FOREIGN PATENT DOCUMENTS

JP 2003-233455 8/2003
JP 2006-024039 1/2006
(Continued)

OTHER PUBLICATIONS

International Search Report of PCT application No. PCT/JP2017/038115 dated Jan. 9, 2018.

*Primary Examiner* — Ram A Mistry
(74) *Attorney, Agent, or Firm* — Renner, Otto, Boisselle & Sklar, LLP

(57) ABSTRACT

An electronic device includes a display unit, a touch panel, and a controller. The display unit displays a pointer that points out an input location. The touch panel detects a touch operation on the display unit with one of a user's finger and a pointing device. The controller controls a display location of the pointer on the display unit and performs an input process in accordance with the touch operation on the touch panel. Moreover, the display unit displays a predetermined region for use in designating, as the display location of the pointer, a location different from a location of the touch operation. When the controller detects a continuous touch operation from an inside to an outside of the predetermined region, the controller moves the pointer at a location different from a touch location in the continuous touch operation, in accordance with movement of the touch location.

5 Claims, 4 Drawing Sheets

(51) Int. Cl.
*G06F 3/0354* (2013.01)
*G06F 3/0481* (2013.01)
*G06F 3/0484* (2013.01)
*G09G 5/36* (2006.01)
*G09G 5/08* (2006.01)
*G09G 5/377* (2006.01)
*G09G 5/00* (2006.01)

(52) U.S. Cl.
CPC .......... *G06F 3/0484* (2013.01); *G06F 3/0488* (2013.01); *G09G 5/00* (2013.01); *G09G 5/08* (2013.01); *G09G 5/36* (2013.01); *G09G 5/377* (2013.01)

(58) Field of Classification Search
CPC .. G06F 3/0484; G06F 3/0488; G06F 3/04883; G09G 5/00; G09G 5/08; G09G 5/36; G09G 5/377
See application file for complete search history.

(56) References Cited

U.S. PATENT DOCUMENTS

| | | |
|---|---|---|
| 2006/0007182 A1 | 1/2006 | Sato et al. |
| 2006/0132460 A1* | 6/2006 | Kolmykov-Zotov ........ G06F 3/04812 345/173 |
| 2009/0140999 A1 | 6/2009 | Sato et al. |
| 2009/0322687 A1 | 12/2009 | Duncan et al. |
| 2010/0253486 A1 | 10/2010 | Sato et al. |
| 2014/0002393 A1* | 1/2014 | Bao ........ G06F 3/0414 345/173 |

FOREIGN PATENT DOCUMENTS

| | | |
|---|---|---|
| JP | 2006-179006 | 7/2006 |
| JP | 2007-226571 | 9/2007 |
| JP | 2011-526396 | 10/2011 |
| WO | 2009/158685 | 12/2009 |

* cited by examiner

ELECTRONIC DEVICE, INPUT CONTROL METHOD, AND PROGRAM FOR CONTROLLING A POINTER ON A DISPLAY

TECHNICAL FIELD

The present disclosure relates to an electronic device with a touch panel, an input control method, and a program.

BACKGROUND ART

PTL 1 discloses an input control method in which a user performs a touch operation on a touch sensing display with his/her finger or a stylus so that a cursor moves across the screen. In this input control method, the cursor moves in response to a drag operation on a region adjacent to the cursor. As a result, the user can accurately instruct a tiny object through the touch operation.

PTL 2 discloses an information processing device that includes: plane coordinates input means; coordinates information acquiring means; angle calculating means for calculating a signed angle from coordinates information; and scroll information creating means for creating scroll information from the singed angle. This information processing device enables continuous scrolling through a few operations on the plane coordinates input means.

CITATION LIST

Patent Literature

PTL 1: Unexamined Japanese Patent Publication No. 2006-179006
PTL 2: Unexamined Japanese Patent Publication No. 2003-233455

SUMMARY OF THE INVENTION

The present disclosure relates to an electronic device, an input control method, and a program, all of which provide improved operability.

An electronic device of the present disclosure includes a display unit, a touch panel, and a controller. The display unit displays a pointer that points out an input location. The touch panel detects a touch operation on the display unit with one of a user's finger and a pointing device to move the pointer. The controller controls a display location of the pointer on the display unit and performs an input process in accordance with the touch operation on the touch panel. Moreover, the display unit displays a predetermined region for use in designating, as the display location of the pointer, a location different from a location of the touch operation. When the controller detects a continuous touch operation from an inside to an outside of the predetermined region, the controller moves the pointer at a location different from a touch location in the continuous touch operation, in accordance with movement of the touch location.

An input control method of the present disclosure includes: displaying, on a display unit, a pointer pointing out an input location; detecting, through a touch panel, a touch operation on the display unit with one of a user's finger and a pointing device to move the pointer; and controlling a display location of the pointer on the display unit and performing an input process on the touch panel by using the controller. This input control method further includes: displaying, on the display unit, a predetermined region for use in designating, as the display location of the pointer, a location different from a location of the touch operation; and when a continuous touch operation from an inside to an outside of the predetermined region is detected, moving the pointer at a location different from a touch location in the continuous touch operation, in accordance with movement of the touch location.

A program of the present disclosure causes a computer to perform the above input control method.

The electronic device, the input control method, and the program according to the present disclosure all provide improved operability.

DESCRIPTION OF EMBODIMENTS

Some exemplary embodiments will be described in detail below with reference to the accompanying drawings as appropriate. However, an excessively detailed description will not be given in some cases. For example, detailed descriptions of known matters and duplicated descriptions of substantially the same configurations will be sometimes skipped. This is to suppress the following description from being excessively redundant and to help those skilled in the art to easily understand the description.

Note that the present inventor will provide the accompanying drawings and the following description for those skilled in the art to sufficiently understand the present disclosure, and thus does not intend to limit the subject matter described in the claims.

Problem

Notebook computers and some other similar electronic devices are equipped with touch pads to be operated by users. A user can operate a touch pad with his/her finger, for example, to move a pointer across the screen or to perform left-click or some other operations on an object pointed out by the pointer. Some electronic devices, such as tablet terminals, have virtual touch pads (virtual pads) on their screens. These virtual pads provide the same functions as touch pads.

When a user performs a swipe operation on a virtual pad, for example, he/she can continue the swipe operation even if his/her finger moves outwardly from the virtual pad. However, when the user performs a tap operation after the finger has moved outwardly from the virtual pad during the swipe operation, for example, he/she needs to visually check where the virtual pad is and then perform a tap operation on this virtual pad. As a result, virtual pads on screens may fail to provide good operability.

An electronic device of the present disclosure has a virtual pad that provides improved operability. More specifically, in addition to a virtual pad on a touch screen at a fixed location, another virtual pad is temporarily provided at a variable location. Both of the virtual pads have substantially the same functions. In other words, substantially the same operations are possible through the virtual pads at the fixed and variable locations. Providing the virtual pad at the fixed location enables the user to continuously operate the pointer without returning his/her finger to the virtual pad at the fixed location. For example, when the user operates a swipe operation starting from the virtual pad at the fixed location, even if his/her finger moves outwardly from a region of the virtual pad at the fixed location, the user can continuously move a pointer. In addition, at a location where the swipe operation has been completed, the user can perform a tap operation on an object pointed out by the pointer. Hereinafter, the electronic device of the present disclosure will be described in detail.

First Exemplary Embodiment

1. Configuration 1. 1 Overall Configuration

Figure 1A:
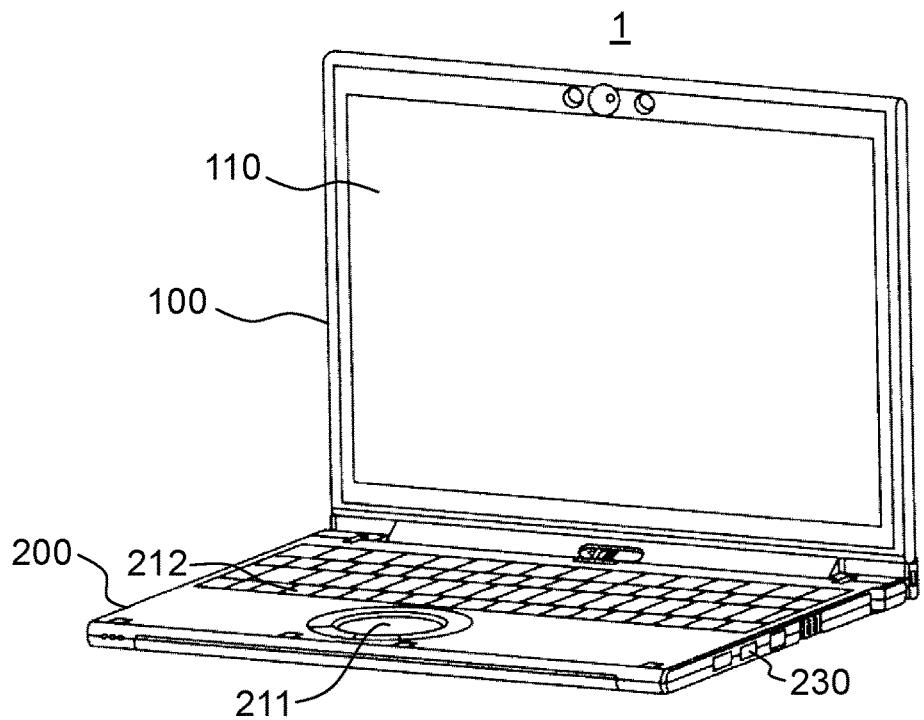
FIG. 1A is a perspective view of an information processing device according to a first exemplary embodiment of the present disclosure.
Figure 1B:
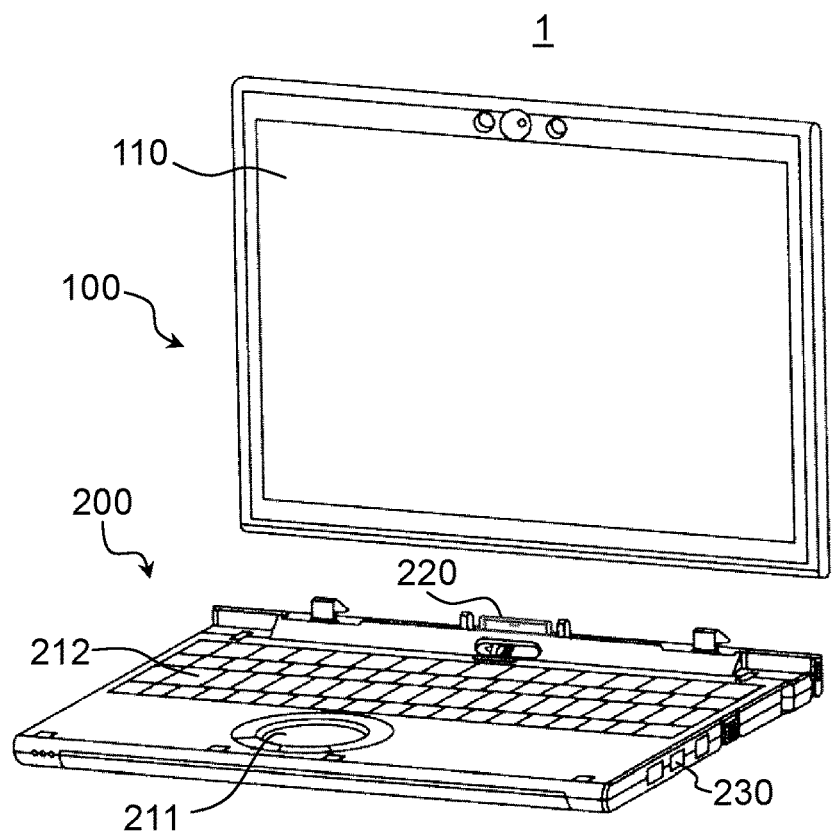
FIG. 1B is a perspective view of the information processing device according to the first exemplary embodiment of the present disclosure.

FIGS. 1A and 1B each illustrate an appearance of an information processing device, which is an example of an electronic device according to a first exemplary embodiment of the present disclosure. Information processing device 1 in this exemplary embodiment includes: tablet terminal 100; and base device 200 attachable to tablet terminal 100. FIG. 1A illustrates tablet terminal 100 in a state of being attached to base device 200. FIG. 1B illustrates tablet terminal 100 in a state of being detached from base device 200. As illustrated in FIGS. 1A and 1B, tablet terminal 100 is attachable to and detachable from base device 200. When tablet terminal 100 is attached to base device 200, information processing device 1 can be used as a notebook computer (see FIG. 1A). Tablet terminal 100 can also be used alone. Further, tablet terminal 100 can be used as a tablet computer (see FIG. 1B). In short, information processing device 1 is a so-called detachable type computer.

1.2 Configuration of Tablet Terminal

Figure 2:
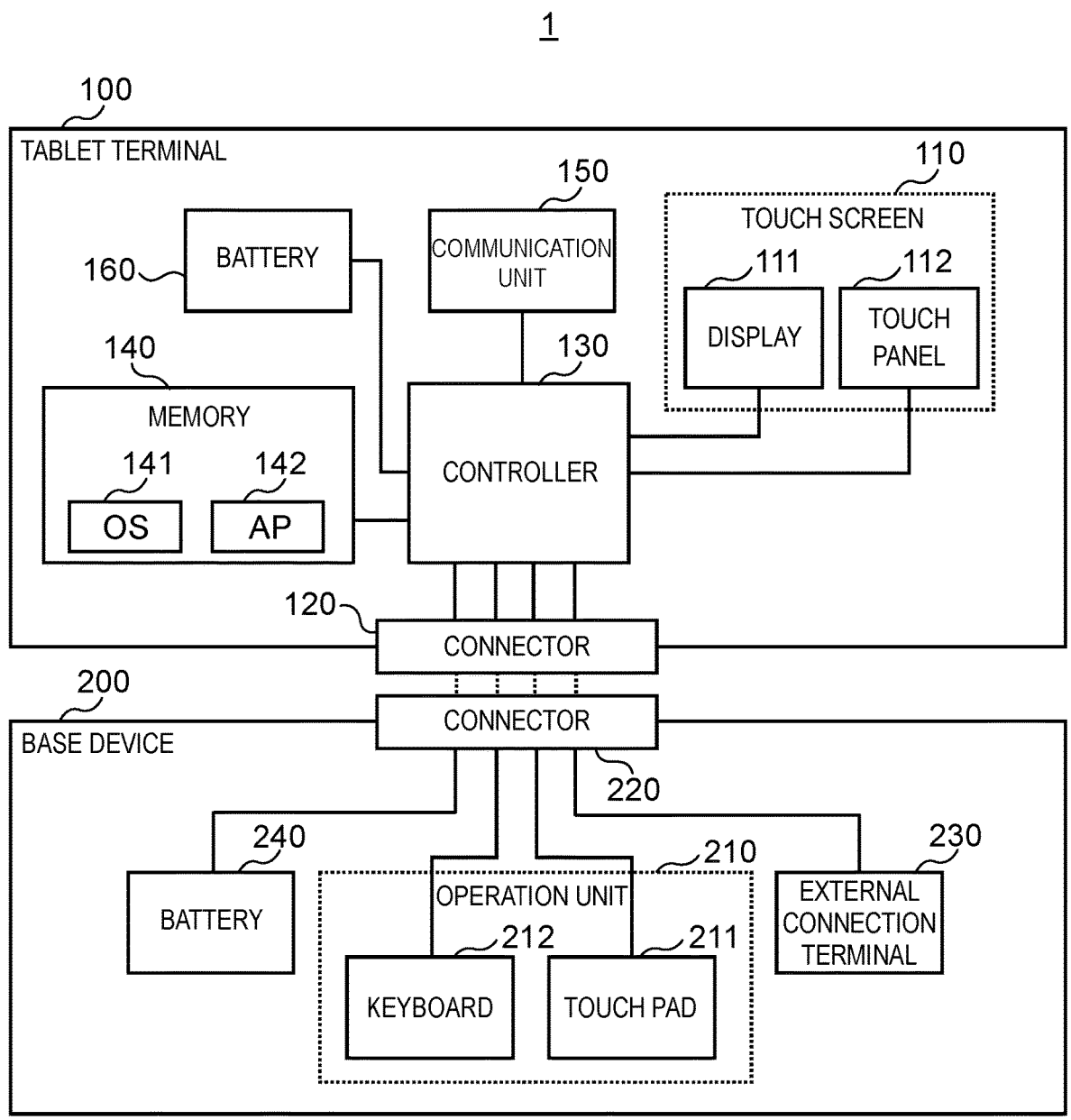
FIG. 2 is a block diagram of a configuration of the information processing device according to the first exemplary embodiment.

FIG. 2 illustrates a configuration of information processing device 1. Tablet terminal 100 includes touch screen 110, connector 120, controller 130, memory 140, communication unit 150, and battery 160.

As illustrated in FIGS. 1A and 1B, touch screen 110 is provided on one principal surface of the housing. Touch screen 110 includes display 111 and touch panel 112. Display 111 may be formed of a liquid crystal display or an organic electroluminescence (EL) display, for example. Touch panel 112 is provided on a surface of display 111. Touch panel 112 detects a touch operation with one of a user's finger and a pointing device (e.g., pen). Touch panel 112 may include an electrode film, for example. Controller 130 can pinpoint a location (touch location) at which the one of the finger and the pointing device makes contact with touch panel 112, for example, by measuring a variation in a voltage or capacitance in response to the contact.

Connector 120 includes connection terminals via which tablet terminal 100 is electrically connected to base device 200.

Controller 130 controls entire information processing device 1. For example, controller 130 controls a display location of a pointer on display 111 and performs an input process in accordance with a touch operation on touch panel 112. Controller 130 may be implemented by a semiconductor element, for example. Controller 130 may be formed of a microcomputer, a central processing unit (CPU), a micro processing unit (MPU), a digital signal processor (DSP), a field programmable gate array (FPGA), or an application specific integrated circuit (ASIC), for example. A function of controller 130 may be implemented in hardware alone or a combination of hardware and software. Memory 140 may be implemented by, for example, one or a combination of read only memory (ROM), a solid state drive (SSD), random access memory (RAM), dynamic random access memory (DRAM), ferroelectric memory, flash memory, and a magnetic disk.

Stored in memory 140 is operating system (OS) 141, various application programs (APs) 142, and various data, for example. Controller 130 implements various functions by reading OS 141, APs 142, and various data to perform arithmetic processing. APs 142 can use an application programming interface (API) of OS 141. For example, while controller 130 is activating APs 142, APs 142 can use the API of OS 141 to acquire coordinates of a location at which one of a user's finger and a pointing device makes contact with touch panel 112.

Communication unit 150 has an interface circuit that communicates with an external device in conformity with a predetermined communication specification (e.g., local area network (LAN) or Wireless Fidelity (Wi-Fi)). Battery 160 may be a rechargeable, secondary battery (e.g., lithium-ion battery), for example.

1. 3 Configuration of Base Device

Base device 200 includes operation unit 210, connector 220, external connection terminal 230, and battery 240.

Operation unit 210 includes touch pad 211 and keyboard 212, both of which allow the user to perform an input operation. Connector 220 includes connection terminals via which tablet terminal 100 is electrically connected to base device 200.

External connection terminal 230 is an input and output port via which base device 200 is to be connected to a peripheral device. External connection terminal 230 may be configured with a communication interface, such as a universal serial bus (USB) or a high-definition multimedia interface (HDMI (registered trademark)). Battery 240 may be a rechargeable, secondary battery (e.g., lithium-ion battery), for example.

When tablet terminal 100 is attached to base device 200, connector 120 of tablet terminal 100 is electrically connected to connector 220 of base device 200. In this case, a circuit inside tablet terminal 100 can transmit a signal or electric power to a circuit inside base device 200 and receive a signal or electric power from the circuit inside base device 200. For example, various pieces of information that are input via operation unit 210 and external connection terminal 230 in base device 200 are transmitted to controller 130.

2. Example of Image on Display

Figure 3A:
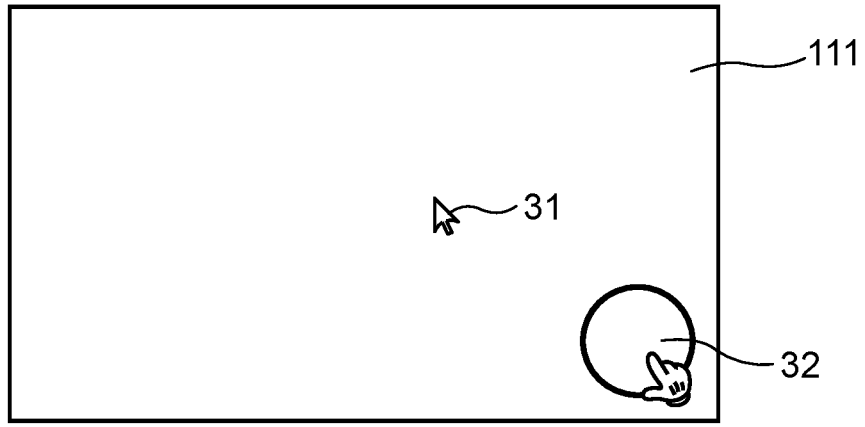
FIG. 3A is a view of an example of an image on a display according to the first exemplary embodiment.
Figure 3B:
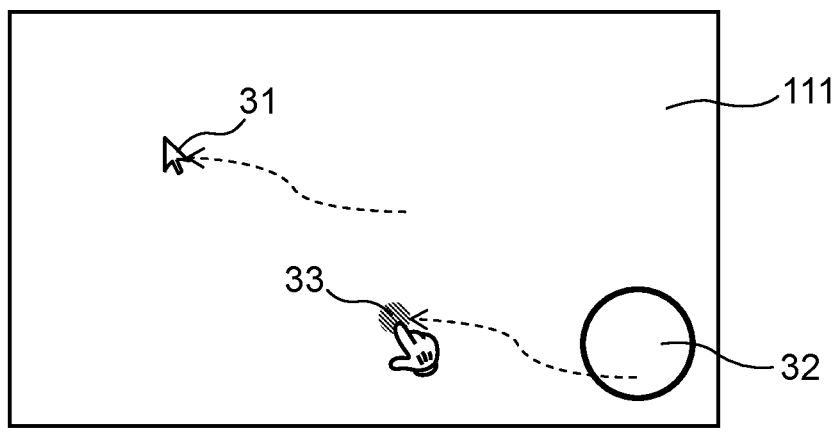
FIG. 3B is a view of an example of an image on the display according to the first exemplary embodiment.
Figure 3C:
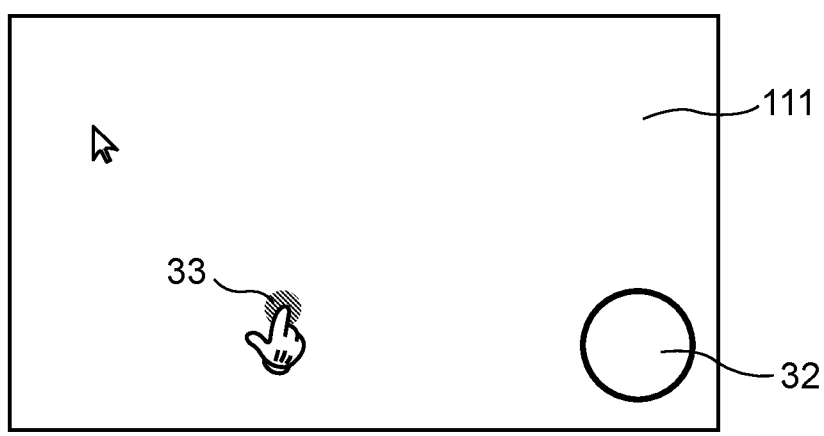
FIG. 3C is a view of an example of an image on the display according to the first exemplary embodiment.

FIGS. 3A to 3C each illustrate an example of an image on display 111. Various APs 142 stored in memory 140 include an AP that has a function of emulating pointer 31 that points out an input location. FIG. 3A illustrates an example of an image on a screen when the AP that emulates pointer 31 is activated.

While the AP that emulates pointer 31 is activated, controller 130 displays pointer 31 and also displays an image defining a region of fixed pad (virtual pad) 32 on a portion (e.g., lower right portion) of display 111. A location of fixed pad 32 is fixed. Fixed pad 32 is a predetermined region that enables a user to perform a touch operation to designate a location of pointer 31 which differs from a touch location. More specifically, the touch operation to designate the location of pointer 31 which differs from the touch location may be a swipe operation. The swipe operation may be an operation in which the user moves one of his/her finger and a pointing device while keeping the one of the finger and the pointing device in contact with touch panel 112. Fixed pad 32 also accepts specific user's touch operations. Examples of such specific user's touch operations include: an operation to move the finger in an arcuate shape related to a scroll operation; and a tap operation to subject an object pointed out by pointer 31 to a process that is the same as a process to be performed in response to left-click without bringing the finger into contact with pointer 31. For example, if the user performs a tap operation on fixed pad 32, controller 130 subjects a current location of pointer 31 to a process that is the same as a process to be performed in response to left-click. More specifically, when the user performs the touch operation on the region of fixed pad 32, pointer 31 does not move to the touch location. When the user performs the touch operation on a region outside fixed pad 32, controller 130 subjects the touch location to the process according to the touch operation. In this case, pointer 31 moves to the touch location in response to the touch operation on the region outside fixed pad 32.

FIG. 3B illustrates an example of an image when the user uses the one of the finger and the pointing device to perform a swipe operation from the inside to the outside of the region of fixed pad 32. During the swipe operation, controller 130 causes display 111 to display an image defining a region of movable pad (virtual pad) 33. In this case, the region of movable pad 33 contains a location at which the one of the finger and the pointing device is in contact with display 111 and a region adjacent to this contact location. For example, the region of movable pad 33 may be a region which has a diameter of 1 cm and the center of which is positioned at the contact location of the one of the finger and the pointing device. For example, an image that designates the region of movable pad 33 with which the one of the finger and the pointing device is in contact may form a circle which has a diameter of 1 cm and the center of which is positioned at the contact location. Movable pad 33 is a region that enables at least one touch operation that is the same as a touch operation to be performed on fixed pad 32. When the one of the finger and the pointing device is in contact with touch panel 112, the location of movable pad 33 is movable and, in fact, moves in accordance with the touch location.

FIG. 3C illustrates an example of an image displayed over a predetermined period (e.g., 1 sec) after the one of the user's finger and the pointing device that has performed the swipe operation from the inside to the outside of the region of fixed pad 32 is separated from touch panel 112. Over the predetermined period after the one of the finger and the pointing device has been separated from touch panel 112, controller 130 causes display 111 to display the image defining the region of movable pad 33. In this case, the region of movable pad 33 contains a location at which the one of the finger and the pointing device has been separated from touch panel 112 and a region adjacent to this location. For example, the region of movable pad 33 may be a region which has a diameter of 1 cm and the center of which is positioned at the separation location of the one of the finger and the pointing device. For example, after the one of the finger and the pointing device has been separated, an image that designates the region of movable pad 33 may form a circle which has a diameter of 1 cm and the center of which is positioned at the separation location. After the one of the finger and the pointing device has been separated from touch panel 112, movable pad 33 is fixed, over the predetermined period, at the location where the one of the finger and the pointing device has been separated from touch panel 112.

Over the period in which the swipe operation is being performed from the inside to the outside of the region of fixed pad 32 and a subsequent predetermined period after the one of the finger and the pointing device has been separated from touch panel 112, controller 130 can accept at least one touch operation (input process) on movable pad 33 which is the same as a touch operation to be accepted through fixed pad 32. As a result, while the swipe operation is being performed from the inside to the outside of the region of fixed pad 32, pointer 31 can move to a location different from the touch location. After the swipe operation has been performed from the inside to the outside of the region of fixed pad 32, controller 130 can emulate a left-click operation in response to a tap operation on the region of movable pad 33.

In this exemplary embodiment, movable pad 33 (see FIG. 3B) displayed when the one of the finger and the pointing device is in contact with touch panel 112 is identical in size and shape to movable pad 33 (see FIG. 3C) displayed after the one of the finger and the pointing device has been separated from touch panel 112. Likewise, the image, illustrated in FIG. 3B, defining the region of movable pad 33 with which the one of the finger and the pointing device is in contact is identical to an image, illustrated in FIG. 3C, defining the region of movable pad 33 from which the one of the finger and the pointing device has been separated. However, a size, a shape, and an image defining the region of movable pad 33 with which the one of the finger and the pointing device is in contact may differ from a size, a shape, and an image defining the region of movable pad 33 with which the one of the finger and the pointing device is not in contact. For example, colors, sizes, or shapes of both images may differ from each other.

3. Operation

Figure 4:
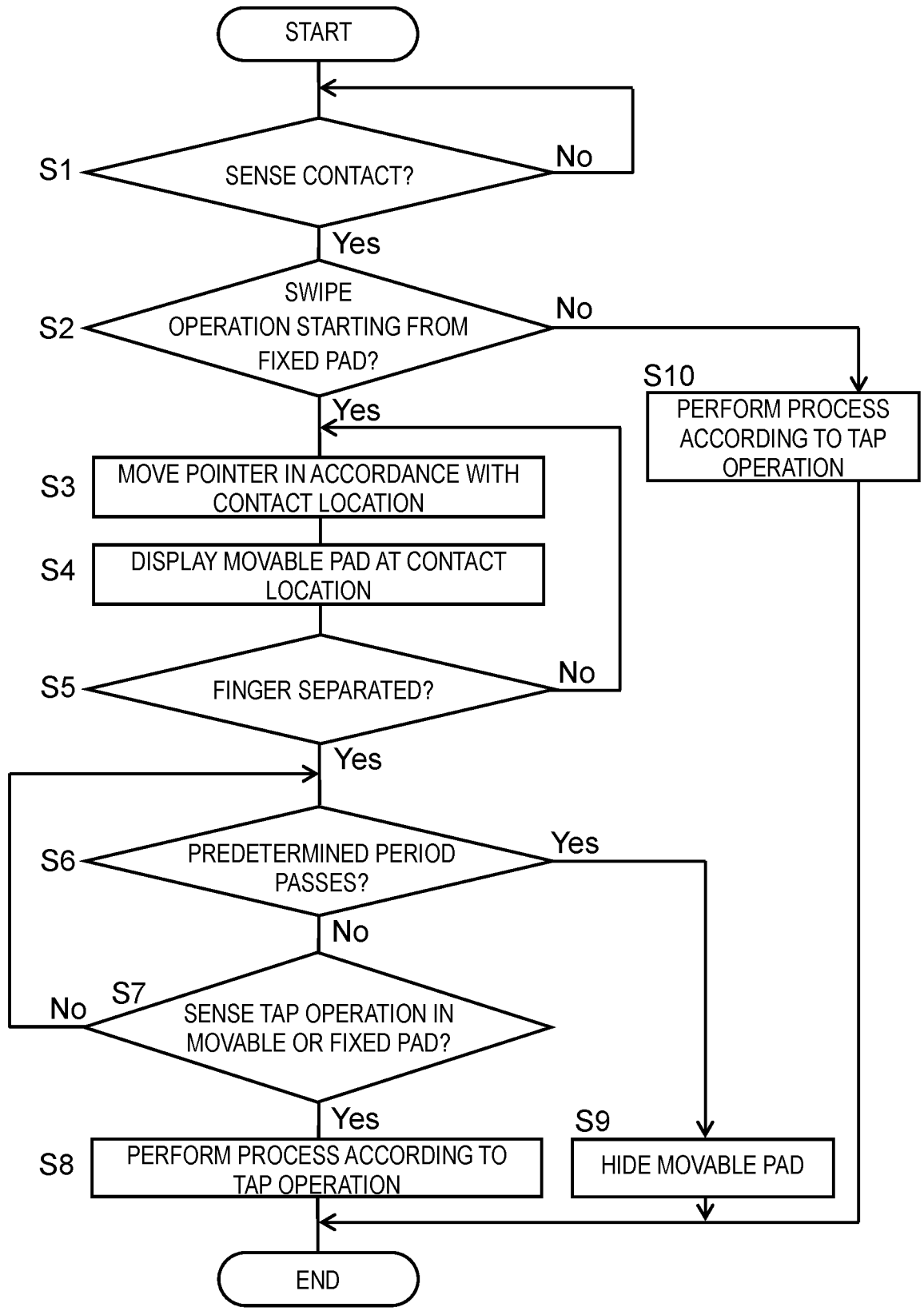
FIG. 4 is a flowchart used to explain control of touch input according to the first exemplary embodiment.

FIG. 4 illustrates an operation of controller 130 when AP 142 that emulates pointer 31 is activated. The following description will be given regarding an example in which the user performs a touch operation by bringing his/her finger into contact with touch panel 112 and, in accordance with this touch operation, controller 130 performs a process. It should be noted that, even if the user performs the touch operation with a pointing device, controller 130 also performs substantially the same process as in FIG. 4.

Controller 130 determines whether a user's finger is in contact with touch panel 112, based on an output from touch panel 112 (S1). When sensing that the user's finger is in contact with touch panel 112, controller 130 determines whether the contact is a swipe operation starting from the region of fixed pad 32 (S2). For example, the determination of whether the contact is the swipe operation starting from the region of fixed pad 32 may be made based on coordinates of the contact location.

When the contact is the swipe operation starting from the region of fixed pad 32 (Yes at S2), controller 130 moves pointer 31 to a location different from the contact location in accordance with changing coordinates of the contact location (S3). More specifically, controller 130 sets the starting point to a current location of pointer 31 and then moves pointer 31 from this starting point in accordance with a moving direction and amount of the contact location.

Controller 130 causes display 111 to display the image defining the region of movable pad 33 on touch panel 112 at the contact location (S4) (see FIG. 3B). As a result, the user can visually perceive that movable pad 33 which can accept an operation the same as an operation to be performed through fixed pad 32 follows the contact location. The locations at which the regions of pointer 31 and movable pad 33 are displayed can be designated by using an API of OS 141, for example.

Controller 130 then determines whether the user's finger is separated from touch panel 112, based on the output from touch panel 112 (S5). When the user's finger is not separated from touch panel 112 (No at S5), controller 130 returns to step S3 and then moves the images of pointer 31 and movable pad 33, based on a current contact location.

When the user's finger is separated from touch panel 112 (Yes at S5), controller 130 determines whether the predetermined period (e.g., 1 sec) has passed after the user's finger has been separated from touch panel 112 (S6). When the predetermined period has not yet passed, controller 130 senses whether a tap operation is performed on movable pad 33 or fixed pad 32 (S7) (see FIG. 3C). When not sensing the tap operation (No at S7), controller 130 returns to step S6. When sensing the tap operation on the region of movable pad 33 or fixed pad 32 before the predetermined period has passed (Yes at S7), controller 130 performs a process in accordance with the tap operation on the location of pointer 31 (S8). In this case, controller 130 subjects an object pointed out by pointer 31 to a process that is the same as a process to be performed in response to the left-click. In other words, controller 130 performs an input process in accordance with a display location of pointer 31.

When the predetermined period has passed after the finger has been separated (Yes at S6), controller 130 deletes movable pad 33 and hides the image defining the region of movable pad 33 (S9) (see FIG. 3A). In other words, when the predetermined period has passed after the finger has been separated, controller 130 confines the function of emulating pointer 31 within the region of fixed pad 32. In this case, when a touch operation is performed on a region outside fixed pad 32, controller 130 performs a process in accordance with a touch location. Since the image defining the region of movable pad 33 is hidden, the user can visually perceive that movable pad 33 is deleted from touch screen 110.

When controller 130 senses the contact and determines that this contact is not a swipe operation starting from the region of fixed pad 32 (No at S2), controller 130 performs a process in accordance with a touch operation based on the contact (S10). For example, if the sensed contact is a tap operation on the region of fixed pad 32, controller 130 may subject a current location of pointer 31 to a process that is the same as a process to be performed in response to the left-click. If the sensed contact is a tap operation on a region outside fixed pad 32, controller 130 subjects the contact location to a process according to the touch operation. For example, if a swipe operation starts from a region outside fixed pad 32, controller 130 moves pointer 31 to the contact location.

4. Effect and Others

Information processing device 1 (an example of an electronic device) of the present disclosure includes display 111 (an example of a display unit), touch panel 112, and controller 130. Display 111 displays pointer 31 pointing out an input location. Touch panel 112 detects a touch operation on display 111 with one of a user's finger and a pointing device to move the pointer. Controller 130 controls a display location of pointer 31 on display 111 and performs an input process in accordance with the touch operation on touch panel 112. Display 111 displays a region (predetermined region) of fixed pad 32 which is used to designate, as the display location of the pointer, a location different from a location of the touch operation. When controller 130 detects a swipe operation (continuous touch operation) from the inside to the outside of the region of fixed pad 32, controller 130 moves pointer 31 at a location different from a touch location in accordance with the movement of the touch location in the swipe operation. In response to a touch operation on a region outside fixed pad 32, controller 130 moves pointer 31 to the touch location. However, when the finger moves from the inside to the outside of the region of fixed pad 32 during the swipe operation, controller 130 moves pointer 31 at a location different from the touch location. As a result, the user can continuously perform the swipe operation to move pointer 31 at a location different from the touch location without returning the finger to fixed pad 32. In this way, information processing device 1 provides improved operability.

After the swipe operation has been performed from the inside to the outside of the region of fixed pad 32, when controller 130 detects that the one of the finger and the pointing device is separated from touch panel 112, controller 130 fixes the display location of pointer 31 and performs an input process over a predetermined period after detecting that the one of the finger and the pointing device has been separated from touch panel 112. This input process is related to the display location of pointer 31 and responds to a touch operation on movable pad 33 (a location at which the one of the finger and the pointing device has been separated and a region adjacent to this location). This touch operation may be a tap operation, for example. As a result, the user can perform the tap operation at a location where the swipe operation has been completed, thereby subjecting a current display location of pointer 31 (i.e., an object pointed out by pointer 31) to a process that is the same as a process to be performed in response to left-click, without returning his/her finger to a region of a fixed pad. In this way, information processing device 1 provides improved operability.

Over the predetermined period, controller 130 causes display 111 to display an image defining the region of movable pad 33 (an image containing the location at which the one of the finger and the pointing device has been separated from touch panel 112). As a result, the user can visually perceive the location at which the finger has been separated from touch panel 112, namely, movable pad 33. In this way, information processing device 1 provides further improved operability.

While detecting the swipe operation from the inside to the outside of the region of fixed pad 32, controller 130 causes display 111 to display the image defining the region of movable pad 33 (a region containing a touch location). As a result, the user can visually perceive that movable pad 33 follows the touch location. In this way, information processing device 1 provides further improved operability.

An input control method of the present disclosure includes: displaying, on display 111, pointer 31 pointing out an input location; detecting, through touch panel 112, a touch operation on display 111 with one of a user's finger and a pointing device to move the pointer; and controlling a display location of pointer 31 on display 111 and performing an input process on touch panel 112 by using controller 130. This input control method further includes: displaying a region (predetermined region) of fixed pad 32 on display 111, the predetermined region being used to designate, as the display location of pointer 31, a location different from a location of the touch operation; and, when a swipe operation (continuous touch operation) is detected from the inside to the outside of the region of fixed pad 32 is detected, moving pointer 31 at a location different from the touch location in accordance with the movement of the touch location in the swipe operation. In response to a touch operation on a region outside fixed pad 32, controller 130 moves pointer 31 to the touch location. However, when the finger moves from the inside to the outside of the region of fixed pad 32 during the swipe operation, controller 130 moves pointer 31 at a location different from the touch location. As a result, the user can continuously perform the swipe operation to move pointer 31 at a location different from the touch location without returning the finger to fixed pad 32. In this way, information processing device 1 provides improved operability.

A program of the present disclosure causes a computer to perform the above input control method. This program may be stored in a storage medium according to the present disclosure.

Other Exemplary Embodiments

The first exemplary embodiment has been described above as an example of the technique disclosed in the present application. However, the technique of the present disclosure is not limited to the first exemplary embodiment, and also applicable to other exemplary embodiments that undergo some modifications, replacements, additions, and omissions, for example, as appropriate. Novel exemplary embodiments may also be contemplated from a combination of some components of the foregoing first exemplary embodiment. Some other exemplary embodiments will be described below as examples.

The first exemplary embodiment has been described regarding the example in which, when receiving a tap operation on movable pad 33, controller 130 performs a process that is the same as a process to be performed in response to left-click. However, an operation performed on movable pad 33 is not limited to a tap operation. As an alternative example, the operation may be an operation of holding down movable pad 33 with one of a finger and a pointing device. When detecting the operation of holding down movable pad 33, controller 130 may perform a process that is the same as a process to be performed in response to right-click.

In the foregoing first exemplary embodiment, controller 130 makes a touch operation starting from a region outside fixed pad 32 operative while pointer 31 is displayed on display 111. More specifically, controller 130 moves pointer 31 to the touch location in response to a touch operation on a region outside fixed pad 32. However, controller 130 may make a touch operation starting from a region outside fixed pad 32 inoperative while pointer 31 is displayed on display 111. In other words, controller 130 may make a touch operation starting from a region outside fixed pad 32 inoperative while an AP that emulates pointer 31 is activated.

Controller 130 may allow a user to perform a setting operation of switching between an image of movable pad 33 displayed when one of a finger and a pointing device is in contact with display 111 (see FIG. 3B) and an image of movable pad 33 displayed after the one of the finger and the pointing device has been separated from display 111 (see FIG. 3C). More specifically, the user may perform a setting operation of changing a color, size, or shape of each image. A size and shape of the region of movable pad 33 may be changed in accordance with a size and shape of the image of movable pad 33. Controller 130 may allow the user to perform a setting operation of changing a color, size, or shape of the image of fixed pad 32. Controller 130 may allow the user to determine a location at which the image of fixed pad 32 is to be displayed or whether to display this image. The determination of whether to display the region of fixed pad 32 or change in a location, size, and shape of this region may depend on display/non-display, a location, size, and shape of the image of fixed pad 32.

In the foregoing first exemplary embodiment, a so-called detachable type computer has been described as an example of the electronic device. An idea of the present disclosure is, however, also applicable to other types of electronic devices with touch panel 112. As an alternative example, the present disclosure is applicable to electronic devices with touch panels, such as tablet terminals.

As described above, the exemplary embodiments have been described as examples of the technique in the present disclosure. For that purpose, the accompanying drawings and the detailed description have been provided. The components illustrated in the accompanying drawings and described in the detailed description can include components essential for solving the problems, as well as components that are not essential for solving the problems but required to describe the above techniques as an example. For this reason, it should not be immediately recognized that those unnecessary components are necessary just because those unnecessary components are described in the accompanying drawings and the detailed description.

The above exemplary embodiments are provided for exemplification of the techniques in the present disclosure, and thus can undergo various modifications, replacements, additions, and removals, for example, within the scope of the claims or equivalents.

INDUSTRIAL APPLICABILITY

The present disclosure is applicable to electronic devices with touch panels. More specifically, the present disclosure is applicable to detachable type computers, tablet terminals, and other similar devices.

REFERENCE MARKS IN THE DRAWINGS

1: information processing device (electronic device)
100: tablet terminal
110: touch screen
111 display (display unit)
112: touch panel
120: connector
130: controller
140: memory
141: operating system
142: application programs
150: communication unit
160: battery
200: base device
210: operation unit
211: touch pad
212: keyboard
220: connector 230: external connection terminal
240: battery

The invention claimed is:

1. An electronic device comprising:
a display unit that displays a pointer pointing out an input location;
a touch panel that detects a first touch operation on the display unit with one of a user's finger and a pointing device to move the pointer; and
a controller controlling a display location of the pointer on the display unit, the controller performing an input process in accordance with a second touch operation on the touch panel, wherein the second touch operation includes both a tap operation to perform a first function and a hold-down operation to perform a second function different than the first function;
wherein the display unit displays a first predetermined region for use in designating, as the display location of the pointer, a location different from a location of the first touch operation, the first predetermined region having a fixed location on the display unit, and
when the controller detects a continuous first touch operation from an inside to an outside of the first predetermined region, the controller moves the pointer at a location different from a touch location in the continuous first touch operation, in accordance with movement of the touch location, and
when the controller detects that the one of the user's finger and the pointing device is separated from the touch panel after the continuous first touch operation has been performed from the inside to the outside of the first predetermined region, the controller fixes the display location of the pointer and performs the input process over a predetermined period after detecting that the one of the user's finger and the pointing device has been separated from the touch panel, the input process being related to the display location of the pointer, the input process responding to the second touch operation on a second predetermined region that is restricted to (i) a location at which the one of the user's finger and the pointing device has been separated from the touch panel and (ii) a region adjacent to the location, the region adjacent to the location being limited to a portion of the display unit that is less than a whole of the display unit.

2. The electronic device according to claim 1, wherein the controller causes the display unit to display an image over the predetermined period, the image indicating the location at which the one of the user's finger and the pointing device has been separated from the touch panel.

3. The electronic device according to claim 1, wherein the controller causes the display unit to display an image indicating the touch location while the controller detects the continuous touch operation from the inside to the outside of the predetermined region.

4. An input control method comprising:
displaying a pointer indicating an input location on a display unit;
detecting, through a touch panel, a first touch operation on the display unit with one of a user's finger and a pointing device to move the pointer;
controlling a display location of the pointer on the display unit, and performing an input process in accordance with a second touch operation on the touch panel, wherein the second touch operation includes both a tap operation to perform a first function and a hold-down operation to perform a second function different than the first function;
displaying a first predetermined region having a fixed location on the display unit, the first predetermined region being used to designate, as the display location of the pointer, a location different from a location of the first touch operation; and
when a continuous first touch operation from an inside to an outside of the first predetermined region is detected, moving the pointer at a location different from a touch location in the continuous first touch operation, in accordance with movement of the touch location
when the one of the user's finger and the pointing device is separated from the touch panel is detected after the moving the pointer at the location different from the touch location, fixing the display location of the pointer and performing the input process over a predetermined period after the one of the user's finger and the pointing device has been separated from the touch panel is detected, the input process being related to the display location of the pointer, the input process responding to the second touch operation on a second predetermined region that is restricted to (i) a location at which the one of the user's finger and the pointing device has been separated from the touch panel and (ii) a region adjacent to the location, the region adjacent to the location being limited to a portion of the display unit that is less than a whole of the display unit.

5. A program causing a computer to perform the input control method according to claim 4.

* * * * *